US012393581B2

(12) United States Patent
Petersen et al.

(10) Patent No.: US 12,393,581 B2
(45) Date of Patent: Aug. 19, 2025

(54) METHOD AND SYSTEM FOR SPECIFYING AN ACTIVE INFERENCE BASED AGENT USING NATURAL LANGUAGE

(71) Applicant: Verses AI, Inc., Vancouver (CA)

(72) Inventors: Capm Petersen, Los Angeles, CA (US); Conor Heins, Berlin (DE); Mahault Albarracin, Montreal (CA); Riddhi Pitlya, Oxford (GB); Tim Verbelen, Dendermonde (BE); Alexander Tschantz, West End (AU); Axel Constant, Montreal (CA); Christopher L. Buckley, Brighton (GB); Alexander Bernard Kiefer, Arverne, NY (US); Karl Friston, Rickmansworth (GB); Steven Swanson, Culver City, CA (US); Gabriel Rene, Los Angeles, CA (US); Tommaso Salvatori, Vienna (AT)

( * ) Notice: Subject to any disclaimer, the term of this patent is extended or adjusted under 35 U.S.C. 154(b) by 0 days.

(21) Appl. No.: 18/770,654

(22) Filed: Jul. 12, 2024

(65) Prior Publication Data
US 2025/0021548 A1  Jan. 16, 2025

Related U.S. Application Data

(60) Provisional application No. 63/513,322, filed on Jul. 12, 2023.

(51) Int. Cl.
*G06F 16/2452* (2019.01)
*G06F 16/22* (2019.01)
*G06F 16/25* (2019.01)

(52) U.S. Cl.
CPC .... *G06F 16/24522* (2019.01); *G06F 16/2237* (2019.01); *G06F 16/258* (2019.01)

(58) Field of Classification Search
CPC .......... G06F 16/24522; G06F 16/2237; G06F 16/258
See application file for complete search history.

(56) References Cited

U.S. PATENT DOCUMENTS 10,629,191 B1 * 4/2020 Cheng ................... G06N 20/00
2019/0197111 A1 * 6/2019 Garrote ................. G06F 40/30

OTHER PUBLICATIONS

Smith, A Step-By-Step Tutorial on Active Inference and its Application to Empirical Data, pp. 1-60, Feb. 4 (Year: 2022).*
Oriol, Maximizing the Potential of LLMs: Using Vector Databases, pp. Apr. 16, pp. 1-9 (Year: 2023).*
Schwartenbeck, Computational mechanisms of curiosity and goal-directed exploration, pp. 1-45 (Year: 2019).*

* cited by examiner

*Primary Examiner* — Albert M Phillips, III
(74) *Attorney, Agent, or Firm* — Novel Patent Services LLC

(57) ABSTRACT

A method and system for specifying an active inference-based agent using natural language.

10 Claims, 3 Drawing Sheets

METHOD AND SYSTEM FOR SPECIFYING AN ACTIVE INFERENCE BASED AGENT USING NATURAL LANGUAGE

FIELD OF INVENTION

The present application deals with Artificial intelligence software.

BACKGROUND

Agent-based modeling is emerging as a popular approach to the design of artificial intelligence software systems. This approach involves the design and deployment of software components known as Agents, which implement monitoring and control functions for devices able to interact with simulated and real-world environments (e.g., controlling the flight of a drone in real-time, or providing a user with a response to its query in natural language). Agents function as software for devices of different kinds (e.g., a robot device, a computer device screen), and can be connected to the operating systems of devices to enable appropriate behavior (e.g., an Agent software in a personal computer that allows for displaying requested geolocalisation information on a computer screen). For purposes of this application, the term device is used to define a physical or virtual entity (e.g., robot, a personal computer, a cell phone) that acts in a real or simulated environment to accomplish a task requested by a user. The term Agent is used herein to define the software controlling a device.

To perform their task, Agents must be endowed with a task specific model. For instance, if the task queried by the user is to fetch a box in a warehouse, the Agent controlling the device responsible for fetching the box must be endowed with a model that includes variables such as "box" and "warehouse". The problem of specification in robotics is the problem of specifying an Agent model that will allow the Agent to perform the task adequately. Specification can be done manually (e.g., by having a software developer writing information in the Agent's model) or automatically, through machine learning and artificial intelligence algorithm extracting relevant variables from a large data set. A model can be overspecified (i.e., noisy model with too many variables), or underspecified (i.e., a model lacking variables necessary for the performance of the task). Manual and automatic methods of specification are limited. Manual specification allows for adequate specification, but is time consuming and is not scalable. Automatic specification by examining a discrete data set is fast, but can be computationally expensive and is always limited to the quality or the informativeness of the dataset. If the data set is incomplete, automatic specification runs the risk of under-specification. When the data set is too large, automatic specification may become unconstrained and can lead to over-specified Agent models and generate "hallucinations" (e.g., attempting to fetch the box under the floor, or in outer space).

SUMMARY OF THE INVENTION

Figure 1:
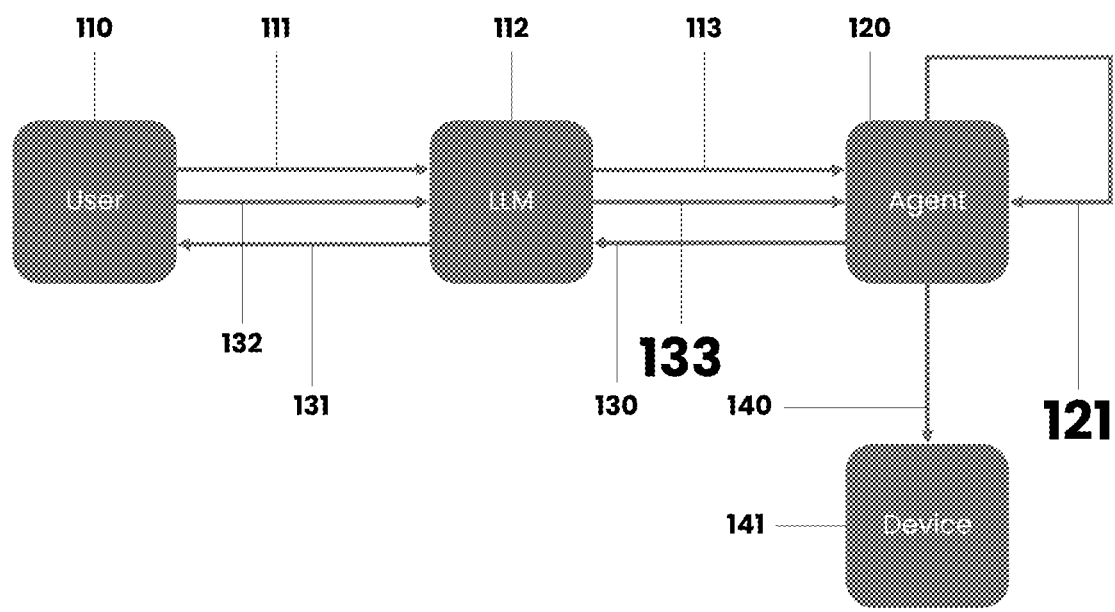
FIG. 1 illustrates a flowchart of one embodiment of the invention.

The claimed method is a novel process for specifying Agent models using conversational interaction between a user and an Agent. The claimed method reduces the cost of manual specification and the under-specification and over-specification risks of automatic specification while simultaneously preserving the accuracy of manual specification. The claimed method takes advantage of the fact that conversational interactions balance the advantages and avoids the disadvantages of automatic and manual specification, a result that has not been achieved before. In typical conversations, people automatically acquire relevant information based on the shared information, and impose guiding constraints over the information that ought to be shared through an exchange of questions and answers. Questions and answers allow the interlocutor to ask the right question in the right situation to acquire information that is most relevant to the instant conversation in order to achieve its associated task (e.g., asking for time—to catch the train—the task). By replicating this communication methodology into the structure of conversation between a user and an Agent, the claimed method enables an Agent's model to be specified on just the right amount and type of data. The claimed method uses an active inference (defined below) algorithm to guide conversational interaction between a user and the Agent. The interaction between the user and the Agent is mediated by a Large Language Model ("LLM").

Definitions

A Large Language Model (LLM) is a model part of the class of computational models known as foundation models. Foundation models are computational models that are pre-trained on a large amount of data. LLMs are foundation models that have been trained on text data, specifically (e.g., text files found online). By analogy, an LLM is like a person who would have read and encoded the information coming from a vast amounts of texts (e.g., has read many books, websites, etc.) and that could combine the knowledge that she has acquired to respond to various queries (e.g., "what is the color of the sky?"). An LLM is built out of the combination of three elements: (i) text data, (ii) a computational architecture, and (iii) a training process. Depending on the LLM, the computational architecture will differ. For instance, for well-known LLMs such as GPT-3, the computational architecture used is a neural network that has a transformer architecture. Transformer architectures perform 1-to-many string comparisons (e.g., comparing a sentence to all similar sentences, or more precisely "tokens") to then generate new sentences that are informed by the syntax of the already known sentences. The process starts with an encoding step that involves: (i) transforming the natural language into token embeddings, which are numerical representations of the words (i.e., strings of numbers), (ii) estimating the normal position of the words and sentences, with respect to one another, which is made possible by the conversion of the words into their numerical equivalent (e.g., "The" comes before "sky"), (iii) tracking the normal relationship between the words turned into numerical representations using a process called self-attention (e.g., words like "blue" relate to nouns like "sky", and not articles like "the" when they are positioned after names like "sky"). The encoded sentences can then be used to perform various mathematical operations to further compare the sentences, find similar sentences, predict what words could be used to complete the sentences, find sentences that respond to other sentences, etc. With respect to how LLMs are used in general, and in this invention, text inputs known as "prompts" are used as inputs to the LLM to generate text output that functions as responses to the prompt. Prompts can be questions (e.g., what is the color of the sky?) or imperative statements (e.g., write a computer code that can be implemented to generate sky in a game engine). Prompts are structured in a way that can elicit the desired response—similar to how one would structure a question posed to humans so as to elicit a certain response. The activity of engineering a prompt to elicit the desired response is called "prompt engineering". In summary, LLMs are used as tools for responding to natural language queries, just like calculators may be used for responding to a query in mathematical language (e.g., "what is 2+2?"). Prompt engineering is the activity of asking the right question to an LLM (e.g., asking "what is 2+2" when looking for an addition instead of asking "what is 2×2"). An LLM is a foundation model trained on text data that takes as input an engineered text "prompt", and processes that prompt to generate an output, which is the response that corresponds to the prompt. This invention is not limited to the use of LLMs based on transformer neural networks, but includes LLMs in general. The claimed method covers any computer system able to receive a prompt-like input and generate the appropriate response to the prompt.

Hyper Space Modeling Language (HSML) is a structured modeling language that specifies the links between entities in a knowledge graph. An HSML graph is a special implementation of a knowledge graph whose syntax combines 1 type of entity or document, and 4 subtypes. The one type is called "entity", and the subentities are: (i) schema (ii) vector spaces, (iii) links, (iv) datalinks. The syntax of HSML documents includes 1 entity type and 4 entity subtypes, and is written in Json format. The entity type is called "entity" (e.g., an object such as "ray ban sunglasses in a warehouse"). The entity is made of several fields including a SoftWare IDentifier SWID tag field, a name field (optional), a description field (optional), and a schema, or array of schema field (denoted as @schema). The schema is the first document subtype. It contains a vectorization field. The vectorization field indicates how to convert the entity to which the schema belongs into a vector representation of that entity (i.e., vectorization strategy). The vectorization field is an array of objects that contains information about the entity's properties, the vectorization program (i.e., algorithmic operations) to vectorize the entity, and a vector space. The vector space is the second subtype, and describes the structure that contains the vectors of the vectorized entity. Vector spaces have two fields, which are the distance metric field (e.g., cosine distance between vectors) and the length field (i.e., vector dimensionality). The third subtype is the link. A link is a relation between two entities (e.g., "ray ban sunglasses" are sold by "the company X") and contains a source—entity—SWID field and a destination—entity—SWID field. HSML allows for two types of links. Normal links and data links. Normal links provide parent-children relationships information between entities. Data links are links that allow for performing operations over entities. Data links thus also contain a transform field, which refers to a program to perform the operation between entities (e.g., decrement the amount of sunglasses by 1 when selling a pair of sunglasses). Data link programs are the fourth and final subtype, and include two fields, which are the program field—indicating the program to be executed—and the data field—indicating the type of data over which the program should execute.

Active inference is an algorithm that applies to predictive statistical models known as generative models and can be used to generate predictions of input data (i.e., "what will happen next") based on a set of underlying assumptions or Bayesian prior beliefs. As applied to a generative model, active inference allows for the generation of action plans to be performed based on predictions about future inputs. In one embodiment of the claimed method, generative models applying the active inference algorithm use a model structure known as Partially Observable Markov Decision Processes (POMDP). The generative model implemented as a POMDP and to which the active inference algorithm applies, functions as the Agent that allows a device to perform an activity. The generation of action plans by active inference Agents is achieved by their generative model by comparing the simulated or predicted input to the true received inputs, and by updating prior beliefs and choosing a course of action accordingly, to minimize the difference between the two. This difference is known as (variational or generalized) free energy. Active Inference can be used to simulate inference (i.e., inferring the causes of sensory data in short timescales), parameter specification (i.e., inferring the parameters of the generative model), and structure specification (i.e., specifying the structure of the generative model). The POMDP is defined by 5 sets of parameters of the generative model, denoted A, B, C, D, and E, which represent different aspects of an agent's generative model. The A, B, C, D, and E parameters are written down as matrices or tensors (in higher dimensional cases) as follows. Each parameter is a matrix or tensor in the traditional sense: they are an array of numbers in two (matrix) or multiple (tensor) dimensions. These are stored as an array in a programming language (e.g., Python or Julia). A: (the likelihood matrix tensor) represents the likelihood of observing (sensory) data given latent states. It connects data or content to the states that cause that data by modeling the mapping of hidden or latent states (causes) to the agent's input (consequences). In this invention, states and observations are both data that form elements of the HSML graph. B: (the state Transition matrix or tensor) describes how states evolve over time; i.e., how one state transitions to the next state as a function of the agent's actions (e.g., the possibility of moving from location L1 to location L2). The agent uses the B matrix to predict how its actions will influence the future hidden states. C: (the Prior Preference or Goal matrix or tensor) encodes the agent's goals in terms of the preferred data or observational outcomes. The agent uses the C matrix to evaluate the desirability of different future inputs, which helps guide its actions toward achieving its goals; i.e., satisfying constraints. D: (the initial Prior State matrix) relates to the agent's beliefs about the current hidden states of the environment that contextualize state transitions. E: (the Habit or action Prior matrix) encodes what the agent will tend to do by default.

Conversational specification happens in the following way:
 a. Query: A user sends a query for a task to an Agent (e.g, asking a robot to pick a box in a warehouse).
 b. Reasoning: The device's Agent attempts to perform the task (e.g., searching the box in the warehouse to bring it back at the user's location).
 c. Inquiry: If the Agent has uncertainty over the location of the box, the agent will send a question to reduce its uncertainty about where the box may be possibly located (e.g., "Where is the box located?").
 d. User reply: the user reply (e.g., "The box is at L2") is used to update the statistical model of the Agent so as to reduce the uncertainty about the object of the query.

e. Specification: The device updates its statistical model based on the user reply, and attempts to perform the query, and if it needs to, will send another enquiry (step c).

In one embodiment of this invention, the code for conversational specification is implemented as a class in the Python programming language and is composed of several methods. The claimed method for conversational specification uses active inference as the algorithm that allows for performing step c and e. The methods of the conversational specification class are the Inquiry method and the specification method. The Inquiry method allows for generating the inquiry. If the task cannot be completed due to uncertainty in the Agent's model parameters (e.g., if it is equally probable that the box is located at location L1 and L2), the agent will not respond to the query and trigger an inquiry (i.e., a call for a question to be asked to the user) instead. The specification method allows for transforming the natural language user reply into statistical information interpretable by the Agent's model parameters, thereby allowing for updating the modeling according to the user reply.

DETAILED DESCRIPTION

Sample text prompts for prompting an LLM to generate a question and parsing the response are given below. It will be appreciated that in the present invention, users will pose natural language queries or questions that need to be converted into machine readable format. Similarly, inquiries by an agent for additional information needs to be converted from machine readable format to natural language:

Generating a Question (Query by a User):

```
Your task is to map a set of actions into a natural language response.
{actions}
Make sure you formulate your response as a question if the input specifies
"ask" as the action.E.g.
'ask RelatedTo paris' should be formulated as "is it related to paris?"."
If the action is null, do not include it in your response.
Input:
{{
  "ask": "box_location"
}}
Response:
Where is the box located?
```

Generating an Observation (Inquiry by an Agent):

```
Your task is to map an input to a set of observations
You must select one of the observations for each key in a dictionary based
on some text input. Your response can only reference observations
included in the list of observations. If the text does not contain information
about a given observation, use the 'null' option.
Observations:
{{
  "box_location" ["L1", "L2"],
  "table_location": ["L1", "L2"]
}}
Input:
I think the box is at L1
Response:
{{ "box_location": "L1" }}
You can use the following conversation history to provide context for the
input: {history}
The response must contain observations found in the observations
dictionary - in the exact same formatting. You should only format your
response based on the input - the conversation history is for context.
```

As an illustration of conversational specification, we present the description of the claimed method within the context of a scenario where an Agent controls a device, which is a robot that has to fetch objects in a warehouse. The possible locations of the warehouse are L1 and L2. The possible objects in the warehouse are a box or a table. The scenario involves a user that sends a "go fetch the box" query. The Agent engages conversational specification with the user to improve its statistical model of the warehouse using the active inference algorithm so as to perform the task adequately.

The scenario that we use to illustrate conversational specification is described by the flowchart of FIG. 1. The user 110 makes a query 111 in natural language. The query 111 in natural language is processed by an LLM 112. The LLM transforms the natural language query into strings 113 of observations and states that refer to the content of the query. The strings are sent to the Agent model 120 to construct the parameters of the Agent's model (parameters A, B, C, D, E as per the definition of active inference). The Agent model is parameterized as illustrated by step 121. The Agent infers the action to be engaged, based on its model. If the Agent's model has enough certainty, the Agent' sends a command 140 to the device 141 to perform the action. The Device 141 performs the action to respond to the user query. If the parameters do not have enough certainty, the Agent 120 sends an inquiry 130 to the user to gather more information. The inquiry 130 generated by the Agent takes the form of a string of states and observations, which are transformed by the LLM 112 into natural language 131 that can be interpreted by the user 110 (e.g., table, box, location L1, location L2) into a question in natural language (e.g., Is the box at location L1 or L2?). The user sends her response 132 in natural language. The LLM 112 interprets the response in natural language and transforms the answer into a string of observations and states 133 that can be used to update the Agent's model. If the Agent's model has enough certainty, the Agent 120 sends a command 140 to the device to perform the action. The Device 141 performs the action to respond to the user query. The claimed method for conversational specification covers steps 121 and 133 as represented by the flow diagram of FIG. 1.

Figure 2:
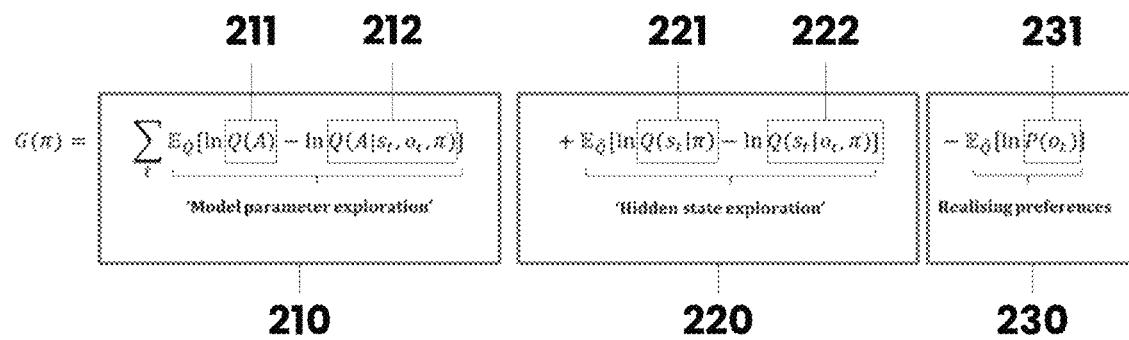
FIG. 2 provides a description of the equation implemented by the Inquiry method.

FIG. 2 provides a description of the equation implemented by the Inquiry method and that allows the Agent to decide whether it should ask a question about the location of observations or if it should send an action command to the device. It details the operation happening in 121 of FIG. 1 and describes the Inquiry method. The operation in 121 is a mathematical operation done by the Agent, which in this embodiment is based on the active inference algorithm. The notation (tau) refers to the time points of observations ('o') and states ('s') considered by the Agent's computation, in reference to its current location. The operation allows the agent to select an action as a command for a device by calculating a value called expected free energy denoted as G.

The notation is summarized in the following table:

| | |
|---|---|
| Q( . . . ) | The posterior probability distribution over what is contained within the bracket. |
| A | The likelihood matrix encoding the conditional probability of observations and states (e.g., the probability of a "box" observation being at location "L1"). |
| S$\tau$ | A state at the time point tau at which it is inferred (e.g., L1 or L2). |

| | |
|---|---|
| Otau | An observation at the time point tau at which it is observed and inferred (e.g., box or table) |
| pi | An action policy, or sequence of states (e.g., moving from location L1 to location L2). |

Expected free energy G is an attribute of an action denoted as pi that a device can perform (e.g., moving from location L1 to location L2). The claimed method allows an Agent to ask questions to the user in case of uncertainty in model parameters. When questions are possible actions of the Agent, expected free energy G allows the Agent to select the most appropriate action among those that fulfill the user query (e.g., going to location L1 to pick the box) and among those that will engage in a conversation with the user to improve the model (e.g., ask the user about the box's location). The most appropriate action will be that which has the lowest G score—the G score being the sum of two terms and the subtraction of one term. The meaning of the three terms are described next.

The mathematical equation for expected free energy G implemented by the inquiry method described in the equation of FIG. 2 is made of three terms. The first term 210 of the equation scores the extent to which an action will reduce uncertainty in parameters encoding the relation between observations (e.g., box and table) and states (e.g., location L1 and L2). It includes the posterior probability 211 (i.e., the probability based on new information) of the parameter encoding the likelihood of an observation (e.g., the box) being at a given state (e.g., location), and the posterior probability 212 (i.e., the probability based on new information) of the parameter encoding the likelihood of an observation (e.g., the box) being at a given state (e.g., location), provided that the device will move to a new state (e.g., new location) and will see new observations (e.g., a box or a table). This means that an action whose expected free energy value G is driven by the first term will be an action that will bring information about the relation between states and observations. The second term 220 of the equation scores the extent to which an action will bring information with respect to how the Agent expects the states to unfold (e.g., will I encounter states different than those that I expect to encounter by going to location L2 where the box may be located?). It includes the posterior probability of a state 221 (e.g., a location) provided that the device will move to a new state, and the posterior probability of a state 222. (e.g., a location) provided that the device will move to a new state (e.g., new location) and will see new observations (e.g., a box or a table). Actions whose expected free energy is driven by the second term are actions whose realization will bring information about the unfolding of states. The third term 230 scores the extent to which an action will be driven by what the Agent seeks to observe, which in the current illustrative scenario corresponds to the object of the user query (e.g., seeking to observe a box instead of a table). This includes the probability of the observation preferred by the user 231, such as defined by the query (e.g., the probability of the box being higher than the probability of the table). If the third term of the equation contributes more to expected free energy than the first two terms, the Agent sends an action command to the device to fulfill the user query irrespective of the risk associated with performing the query under imperfect knowledge, or model uncertainty.

The operation of the inquiry method involves computing the expected free energy for all the possible actions, given the current location and observations available to the Agent (e.g., as the Agent is in location L1 and observes a table). If there is uncertainty in the Agent's model and if the action with the least expected free energy is an inquiry action, then the Agent will engage the inquiry action and ask the user for additional information about the location of possible observations (e.g., "what is the location of the box?") to reduce its model uncertainty.

Figure 3:
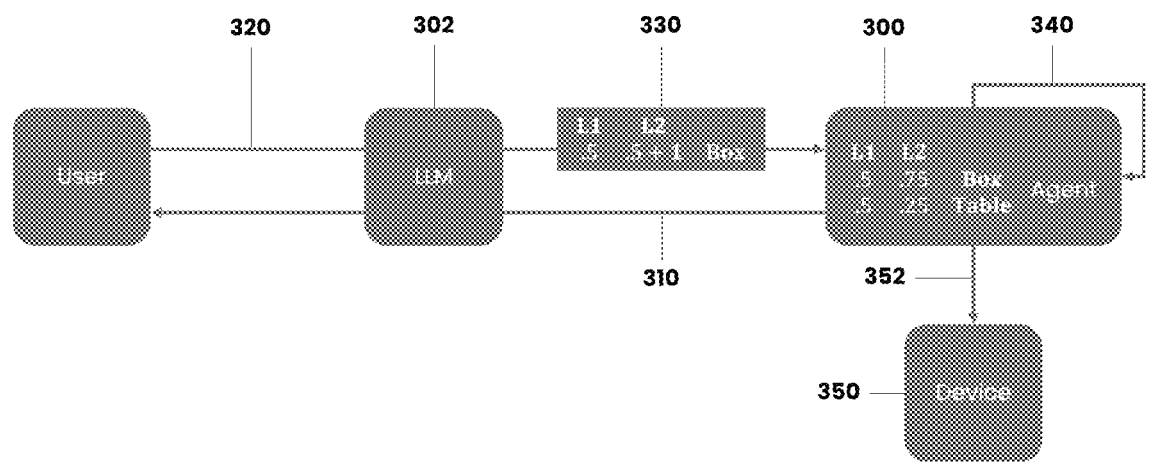
FIG. 3 provides a description of the process implemented by the Specification method.

FIG. 3 illustrates the way the user replies allow for specification in the Agent's model. It presents the specification method in the form of a block diagram. The steps shown, convert the user's reply to the Agent's inquiry into information that can be acquired by the Agent's model. This corresponds to step 133 in the diagram of FIG. 1. When the operation of the inquiry method described in FIG. 2 leads to an inquiry action, the Agent 300 communicates with a LLM 302 to convert query 310 in the form of vectors of observations and states and their categories (e.g., tables, box, L1, L2, items, warehouse locations) into a question for the user (e.g., where in the warehouse is the box located?). The user reply in natural language is processed back by the LLM 302 to update the Agent's model. The user reply (e.g., the box is at L2) allows for adding counts (e.g., +1) for the state-observation pairs (e.g., L2-box) in the Agent's model parameter responsible for encoding the probability mappings between observations and states (e.g., the probability of the box being at location L2). The Agent 300 uses the active inference algorithm to update the parameter encoding the probability mappings between observations and states 340 expressed as Dirichlet distributions. The update is done according to the change in counts (e.g., 1.5/2 being normalized as 0.75, and 0.5/2 being normalized as 0.25). If the user response leads to greater model certainty (e.g., moving from 50% chance that the box is at L2 to 75% chance that the box is at L2), the inquiry method will not lead to selecting information seeking actions at the next cycle of the inquiry method. Instead, the Agent will send an action command 350 to the device 352. The consequence of an increase in certainty is that action selection becomes driven by the third term of the equation in FIG. 2. Because the third term corresponds to the user's preferences (e.g., "fetch me a box, not a table"), the action with the least expected free energy when there is no uncertainty in the model will be the action that realizes the user's preferences; hence, with increase in certainty, the Agent can send the action command to the device (e.g., "go to location L2 to fetch the box").

What is claimed is:

1. A system for specifying artificial intelligence agent behavior using natural language user queries and inferring action policies of artificial intelligence agents for use in a physical or virtual device, comprising:
    a processor on a computer system,
    at least one storage medium in communication with the processor, which at least one storage medium includes code defining:
        an agent model,
        Create, Read, Update, and Delete (CRUD) functionality configured to communicate in natural language with
        software that translates natural language into vectorized entities encoded in a knowledge graph implementing the Hyperspatial Modeling Language (HSML),
        a hyperspatial Modeling Language (HSML) that defines a special implementation of a knowledge graph, referred to herein as an HSML graph, whose syntax defines entities in physical or virtual space that the agent interacts with, each entity comprising an entity type, and 4 entity subtypes that include (i) schema (ii) vector space, (iii) links, (iv) datalinks, wherein the schema contains a vectorization field for receiving the vector of the vectorized entity that is represented by the HSML knowledge graph, and wherein the vector space describes the structure of the vectors for the vectorized entity, and wherein the link defines the relationship between two or more entities, the HSML thus defining the syntax for translating entities described in natural language into vectorized representations of those entities expected by the HSML graph, a translation software that uses the syntax defined by the HSML to translate the natural language description of entities into vectorized representations, wherein the translation software is a Large Language Model (LLM), or any software capable of transforming natural language into vectorized representations in accordance with the syntax defined by the modelling language of HSML, and active inference agent software capable of computing a numerical value called expected free energy based on a model whose parameters map the vectorized entities stored in the HSML graph, and that scores the value of action policies available to the agent, the system further including the device that is controlled by the agent model.

2. The system of claim 1, wherein the active inference agent software comprises a generative model with parameters A, B, C, D and E encoded as vectors, matrices or tensors and representing probability distributions over states and observations representing HSML graph entities and implemented as a partially observable Markov decision process (POMDP) allowing the agent to infer action policies by computing expected free energy and to control a device to act in a physical or virtual environment, wherein the computation of expected free energy results from matrix multiplication operations using the A parameter, the C parameter, and the posterior distribution over states given the policy being evaluated for a given time point.

3. A system of claim 2, wherein, the difference of the log probability of the product of the A matrix and $(s_{pi,t})$ $(\ln(As_{pi,t}))$ and the log probability of the C parameter at time t $(\ln(C_t))$ is used in a dot product (·) with $As_{pi,t}$ to obtain the value for the first component of expected free energy $(As\_pi\_t \cdot (\ln(As_{pi,t}) - \ln(C_t))$ where the expected free energy value is the difference between the first component and the second component corresponding to the negative of the dot product (·) of the diagonal elements of the transform (T) of the A matrix $A^T$ multiplied by the log probability of the A matrix $(\ln(A))$ $(-\text{diag}(A^T \ln A))$ and the posterior distribution $s_{pi,t}$, and where the expected free energy $((As\_pi\_t \cdot (\ln(As_{pi,t}) - \ln(C_t)) - ((-\text{diag}(A^T \ln A) \cdot s_{pi,t}))$ is calculated for each possible policy (pi).

4. The system of claim 1, wherein the software that translates natural language into vectorized representations is a Large Language Model, or any software capable of transforming natural language into vectorized representation.

5. A method performed by one or more computers for specifying an active inference agent model that maps observation entities and state entities, and is capable of controlling a physical or virtual device by means of natural language, comprising, representing the observation entities and state entities modelled by the active inference model using a Hyper Spatial Modeling Language (HSML) graph defined by the syntax of Hyper Spatial Modeling Language (HSML), receiving a user query in natural language for a task to be completed by the active inference agent controlling the device, using Create, Read, Update, and Delete (CRUD) functionality configured to communicate in natural language with a Large Language Model (LLM) software, or any transformation software capable of transforming natural language into vectorized representations in accordance with the syntax defined by the modelling language of HSML, converting the entities in natural language contained in the query into vector representations using the LLM or other transformation software, based on the syntax defined by the Hyper Spatial Modeling Language (HSML) to translate the natural language description of entities into vectorized representations, implementing the HSML knowledge graph into an active inference agent model capable of computing a numerical value called expected free energy based on the active inference agent model whose parameters map the vectorized entities stored in the HSML graph, and that scores the value of the action policies available to the agent, wherein the device is controlled by the active inference agent model, the active inference agent model comprising parameters A, B, C, D and E encoded as vectors, matrices or tensors and representing probability distributions and implemented as a partially observable Markov decision process (POMDP) allowing the agent to infer action policies by computing expected free energy and to control a device to act in a physical or virtual environment, and wherein the computation of expected free energy results from matrix multiplication operations using the A parameter, the C parameter, and the posterior distribution over states given the policy being evaluated for a given time point.

6. The method of claim 5, wherein the conversion of the natural language query into vector representations is done using a large language model (LLM) or any transformation software capable of transforming natural language into vectorized representations in accordance with the syntax defined by the modelling language of HSML.

7. The method of claim 5, wherein an active inference model is used to compute the expected free energy of the action policies of all the possible actions of the agents, including the action of inquiring on additional information by querying the user and the action of accomplishing the task queried by the user, wherein the action policy with the least expected free energy is the action policy engaged by the agent to control the device, and wherein the inference of the action policy and device control uses an active inference algorithm that includes one or more of belief propagation, variational message passing, Laplace propagation, and Expectation Propagation algorithms.

8. The method of claim 5, wherein the update of the active inference model parameters uses a method of count, wherein the parameters of the agent model are denoted as A, B, C, D and E representing probability distributions and encoded as vectors, matrices or tensors implemented as a partially observable Markov decision process (POMDP), wherein a count of +1 is added to the cell of the vector, matrix or tensor of the A, B, C, D and E, each cell representing an element of a probability distribution, and where the probability distribution is normalized after having added the count to ensure that the distribution sums to 1.

9. A method of claim 5, wherein, the HSML defines a special implementation of a knowledge graph, referred to herein as an HSML graph, whose syntax defines entities in physical or virtual space that the agent interacts with, each entity comprising an entity type, and 4 entity subtypes that include (i) schema (ii) vector space, (iii) links, (iv) datalinks, wherein the schema contains a vectorization field for receiving the vector of the vectorized entity that is represented by the HSML knowledge graph, and wherein the vector space describes the structure of the vectors for the vectorized entity, and wherein the link defines the relationship between two or more entities, HSML thus defining the syntax for translating entities described in natural language into vectorized representations of those entities expected by the HSML graph.

10. A method of claim 5, wherein, the difference of the log probability of the product of the A matrix and $(s_{pi,t})$ $(\ln(As_{pi,t}))$ and the log probability of the C parameter at time t $(\ln(C_t))$ is used in a dot product $(\cdot)$ with $As_{pi,t}$ to obtain the value for the first component of expected free energy $(As\_pi\_t \cdot (\ln(As_{pi,t}) - \ln(C_t))$ where the expected free energy value is the difference between the first component and the second component corresponding to the negative of the dot product $(\cdot)$ of the diagonal elements of the transform (T) of the A matrix $A^T$ multiplied by the log probability of the A matrix $(\ln(A))$ $(-\text{diag}(A^T \ln A))$ and the posterior distribution $s_{pi,t}$, and where the expected free energy $((As\_pi\_t \cdot (\ln(As_{pi,t}) - \ln(C_t)) - ((-\text{diag}(A^T \ln A) \cdot s_{pi,t}))$ is calculated for each possible policy (pi).

* * * * *